United States Patent
Love et al.

(10) Patent No.: US 8,543,477 B2
(45) Date of Patent: Sep. 24, 2013

(54) VALUE TRACKING AND REPORTING OF AUTOMATED CLEARING HOUSE TRANSACTIONS

(75) Inventors: Robert Anthony Love, Stockbridge, GA (US); Lantanya Neale Mauriello, Suwanee, GA (US); Nesta Valerie Reckord-Yarde, Lithonia, GA (US); Susan Lynne Robertson, Decatur, GA (US); Robert Williams, Decatur, GA (US); Donald E. Nelson, Marietta, GA (US)

(73) Assignee: Federal Reserve Bank of Atlanta, Atlanta, GA (US)

( * ) Notice: Subject to any disclaimer, the term of this patent is extended or adjusted under 35 U.S.C. 154(b) by 2963 days.

(21) Appl. No.: 10/953,754

(22) Filed: Sep. 29, 2004

(65) Prior Publication Data

US 2005/0086136 A1   Apr. 21, 2005

Related U.S. Application Data

(60) Provisional application No. 60/507,294, filed on Sep. 30, 2003.

(51) Int. Cl.
*G06Q 40/00* (2012.01)
(52) U.S. Cl.
USPC .............. 705/35; 705/39; 705/42; 705/57; 705/64; 705/67; 705/76
(58) Field of Classification Search
USPC ................. 705/35, 39, 42, 57, 64, 67, 76
See application file for complete search history.

(56) References Cited

U.S. PATENT DOCUMENTS

| | | | |
|---|---|---|---|
| 4,270,042 | A | 5/1981 | Case |
| 4,727,243 | A | 2/1988 | Savar |
| 4,823,264 | A | 4/1989 | Deming |
| 5,121,945 | A | 6/1992 | Thomson et al. |
| 5,175,682 | A | 12/1992 | Higashiyama et al. |
| 5,448,043 | A | 9/1995 | Nakano et al. |
| 5,532,464 | A | 7/1996 | Josephson et al. |
| 5,691,524 | A | 11/1997 | Josephson |

(Continued)

FOREIGN PATENT DOCUMENTS

WO   WO0030053   5/2000

OTHER PUBLICATIONS

U.S. Appl. No. 60/416,663, filed Oct. 7, 2002, Yusin.

(Continued)

*Primary Examiner* — Daniel Felten
(74) *Attorney, Agent, or Firm* — King & Spalding (57) ABSTRACT

Value tracking of automated clearing house ("ACH") payments processed by an ACH operator includes receiving an ACH file for ACH processing. The ACH file comprises ACH payments originated by a remote sending point on behalf of a sending customer. A sum value of the ACH payments is added to a value of prior payments processed for the sending customer during a specified time period to obtain an accumulated payment value. The accumulated payment value is compared to a pre-established payment cap to determine whether the accumulated payment value exceeds the payment cap. The ACH payments are processed in response to a determination that the accumulated payment value does not exceed the payment cap. Whether to override the payment cap can be determined in response to a determination that the accumulated payment value exceeds the payment cap.

56 Claims, 5 Drawing Sheets

(56) References Cited

U.S. PATENT DOCUMENTS

| | | |
|---|---|---|
| 5,717,868 A | 2/1998 | James |
| 5,742,819 A | 4/1998 | Caccavale |
| 5,761,510 A | 6/1998 | Smith et al. |
| 5,783,808 A | 7/1998 | Josephson |
| 5,787,402 A | 7/1998 | Potter et al. |
| 5,790,778 A | 8/1998 | Bush et al. |
| 5,794,234 A | 8/1998 | Church et al. |
| 5,825,003 A | 10/1998 | Jennings et al. |
| 5,848,400 A | 12/1998 | Chang |
| 5,852,812 A | 12/1998 | Reeder |
| 5,903,878 A | 5/1999 | Talati et al. |
| 5,940,813 A | 8/1999 | Hutchings |
| 5,946,669 A | 8/1999 | Polk |
| 5,956,700 A | 9/1999 | Landry |
| 5,963,647 A | 10/1999 | Downing et al. |
| 5,963,648 A | 10/1999 | Rosen |
| 5,978,485 A | 11/1999 | Rosen |
| 6,026,379 A | 2/2000 | Haller et al. |
| 6,032,133 A | 2/2000 | Hilt et al. |
| 6,061,665 A | 5/2000 | Bahreman |
| 6,076,064 A | 6/2000 | Rose |
| 6,076,074 A | 6/2000 | Cotton et al. |
| 6,098,053 A | 8/2000 | Slater |
| 6,119,107 A | 9/2000 | Polk |
| 6,141,651 A | 10/2000 | Riley et al. |
| 6,173,272 B1 | 1/2001 | Thomas et al. |
| 6,205,433 B1 | 3/2001 | Boesch et al. |
| 6,216,115 B1 | 4/2001 | Barrameda et al. |
| 6,243,689 B1 | 6/2001 | Norton |
| 6,246,999 B1 | 6/2001 | Riley et al. |
| 6,269,345 B1 | 7/2001 | Riboud |
| 6,304,860 B1 | 10/2001 | Martin, Jr. et al. |
| 6,317,745 B1 | 11/2001 | Thomas et al. |
| 6,408,284 B1 | 6/2002 | Hilt et al. |
| 6,598,028 B1 | 7/2003 | Sullivan et al. |
| 6,615,258 B1 | 9/2003 | Barry |
| 6,629,081 B1 | 9/2003 | Cornelius et al. |
| 6,721,715 B2 | 4/2004 | Nemzow |
| 6,754,640 B2 | 6/2004 | Bozeman |
| 6,829,590 B1 | 12/2004 | Greener et al. |
| 6,856,970 B1 | 2/2005 | Campbell et al. |
| 6,868,408 B1 | 3/2005 | Rosen |
| 6,873,972 B1 | 3/2005 | Marcial et al. |
| 6,892,184 B1 | 5/2005 | Komem |
| 7,120,606 B1 * | 10/2006 | Ranzini et al. .................. 705/64 |
| 7,269,575 B1 | 9/2007 | Concannon et al. |
| 7,283,656 B2 | 10/2007 | Blake et al. |
| 2001/0034682 A1 | 10/2001 | Knight et al. |
| 2001/0034702 A1 | 10/2001 | Mockett et al. |
| 2002/0016769 A1 | 2/2002 | Barbara et al. .................. 705/40 |
| 2002/0029194 A1 | 3/2002 | Lewis et al. |
| 2002/0032642 A1 | 3/2002 | Chichilnisky |
| 2002/0035561 A1 | 3/2002 | Archer et al. |
| 2002/0038305 A1 | 3/2002 | Bahl et al. |
| 2002/0055904 A1 | 5/2002 | Mon |
| 2002/0072942 A1 | 6/2002 | Kuykendall et al. |
| 2002/0077971 A1 | 6/2002 | Allred |
| 2002/0082962 A1 | 6/2002 | Farris et al. |
| 2002/0087455 A1 | 7/2002 | Tsagarakis et al. |
| 2002/0099656 A1 | 7/2002 | Poh Wong |
| 2002/0120537 A1 | 8/2002 | Morea |
| 2002/0120846 A1 | 8/2002 | Stewart et al. |
| 2002/0161692 A1 | 10/2002 | Loh et al. |
| 2002/0161707 A1 | 10/2002 | Cole |
| 2002/0185529 A1 | 12/2002 | Cooper et al. |
| 2003/0018554 A1 | 1/2003 | Lyftogt et al. |
| 2003/0024979 A1 | 2/2003 | Hansen et al. |
| 2003/0033228 A1 | 2/2003 | Bosworth-Davies et al. |
| 2003/0050892 A1 | 3/2003 | Clynes |
| 2003/0055756 A1 | 3/2003 | Allan |
| 2003/0065594 A1 | 4/2003 | Murphy |
| 2003/0065941 A1 | 4/2003 | Ballard |
| 2003/0070080 A1 | 4/2003 | Rosen |
| 2003/0105710 A1 | 6/2003 | Barbara et al. |
| 2003/0126094 A1 | 7/2003 | Fisher et al. |
| 2003/0144942 A1 | 7/2003 | Sobek .............................. 705/36 |
| 2003/0158811 A1 | 8/2003 | Sanders et al. .................. 705/39 |
| 2003/0167223 A1 | 9/2003 | Pledereder et al. |
| 2003/0167237 A1 | 9/2003 | Degen et al. |
| 2003/0177087 A1 | 9/2003 | Lawrence |
| 2003/0182227 A1 | 9/2003 | Guzman |
| 2003/0187783 A1 | 10/2003 | Arthus et al. |
| 2003/0187792 A1 | 10/2003 | Hansen et al. |
| 2003/0208439 A1 | 11/2003 | Rast ................................ 705/38 |
| 2003/0208440 A1 | 11/2003 | Harada et al. |
| 2003/0208445 A1 | 11/2003 | Compiano |
| 2003/0220878 A1 | 11/2003 | Degen et al. |
| 2003/0229586 A1 | 12/2003 | Repak ............................ 705/39 |
| 2003/0233319 A1 | 12/2003 | Lawrence ....................... 705/39 |
| 2004/0002914 A1 | 1/2004 | Munro |
| 2004/0006533 A1 | 1/2004 | Lawrence |
| 2004/0024709 A1 | 2/2004 | Yu et al. |
| 2004/0030621 A1 | 2/2004 | Cobb |
| 2004/0034594 A1 | 2/2004 | Thomas et al. |
| 2004/0078328 A1 | 4/2004 | Talbert et al. |
| 2004/0078332 A1 | 4/2004 | Ferguson et al. |
| 2004/0083167 A1 | 4/2004 | Kight et al. |
| 2004/0093305 A1 | 5/2004 | Kight et al. ..................... 705/40 |
| 2004/0109596 A1 | 6/2004 | Doran |
| 2004/0117299 A1 | 6/2004 | Algiene et al. |
| 2004/0128240 A1 | 7/2004 | Yusin |
| 2004/0138973 A1 | 7/2004 | Keis et al. |
| 2004/0143621 A1 | 7/2004 | Fredrickson et al. |
| 2004/0148225 A1 | 7/2004 | Olafsson |
| 2004/0153403 A1 | 8/2004 | Sadre |
| 2004/0199463 A1 | 10/2004 | Deggendorf |
| 2004/0205011 A1 | 10/2004 | Northington et al. ........... 705/35 |
| 2004/0236646 A1 | 11/2004 | Wu et al. |
| 2005/0004872 A1 | 1/2005 | Gavin et al. |
| 2005/0021454 A1 | 1/2005 | Karpovich et al. |
| 2005/0038743 A1 | 2/2005 | Stanley et al. |
| 2005/0044043 A1 | 2/2005 | Gooding et al. |
| 2005/0086136 A1 | 4/2005 | Love et al. |
| 2005/0167481 A1 | 8/2005 | Hansen et al. |
| 2005/0177464 A1 | 8/2005 | Komem et al. |
| 2005/0209961 A1 | 9/2005 | Michelsen et al. |
| 2006/0167784 A1 | 7/2006 | Hoffberg |
| 2006/0191998 A1 | 8/2006 | Mueller et al. |
| 2006/0206427 A1 | 9/2006 | Love et al. |
| 2007/0235518 A1 | 10/2007 | Mueller et al. |
| 2008/0159655 A1 | 7/2008 | Breeden |
| 2008/0162319 A1 | 7/2008 | Breeden et al. |
| 2008/0162320 A1 | 7/2008 | Mueller et al. |
| 2008/0162321 A1 | 7/2008 | Breeden et al. |
| 2008/0162322 A1 | 7/2008 | Breeden et al. |

OTHER PUBLICATIONS

Eurogiro, Development of Interface Between FED and Eurogiro, Request for Proposal, Jan. 14, 2003, Uwe Holmsgaard, Eurogiro Network A/S.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

Fedline User Guide, ACH, Version 2.4, Mar. 2002, including Fedline User Guide, Host Communications, Version 2.4, Jun. 1997.

ACH Goes Across the Border, South Florida Banking Institute, Vicki Anderson, Retail Payments Office, Federal Reserve System, Oct. 29, 2001.

William B. Nelson, ACH News From Europe, Payments Journal, Jan./Feb. 2002.

International ACH—Expanding the Gateway Concept Beyond Canada, Vicki Anderson, Retail Payments Office, Federal Reserve System, Apr. 15, 2002.

International Direct Deposit Technical Walkthru, Prepared for IRPPO, Oct. 9, 2002.

FedACH$^{SM}$ Product Development Discussion, Federal Reserve Financial Services, U.S. Bank, Nov. 30, 2001.

International Direct Deposit Overview, Electronic Payments, EROC, Federal Reserve Bank of New York, Oct. 9, 2002.

Overview of the Federal Reserve System's Check to ACH Conversion (CTAC) Product, Presented Feb. 15, 2002.

Overview, Federal Reserve and Check to ACH Conversion (CTAC), Presented to SWACHA—The Electronic Payments Resource, Jul. 31, 2002.

The Federal Reserve & Check-to-ACH Conversion, NACHA Electronic Check Conference, Sep. 23-24, 2002, Terry Roth, Retail Payments Office of the Federal Reserve System.

2002 ACH Rules, A Complete Guide to Rules & Regulations Governing the ACH Network, National Automated Clearing House Association, Copyright 2002. Attached pages: 1) Understanding the ACH Network: An ACH Primer, pp. 1-17; 2) Operating Rules of the National Automated Clearing House Association, Article Eight, pp. 28-29; 3) Operating Guidelines of the National Automated Clearing House Association: Section II, Chapter III, pp. 40-45; and Section IV, Chapter VI, pp. 120-140; and 4) Federal Reserve Bank Uniform Operating Circular [No. 4] on Automated Clearing House Items, Jun. 25, 2001.

PC AIMS User's Guide, Credit Controls, pp. 10-1 to 10-8, Feb. 25, 2002.

EPN Voice Response System (RALPH), Applicants submit that this document was published prior to Sep. 30, 2003.

Excerpt of Bank of America checking account statement, with personal information redacted, Aug. 2008.

Van Natta, D. & O'Brien, T., Flow of Saudis' Cash to Hamas is Scrutinized, NY Times, Sep. 17, 2003.

* cited by examiner

FedACH Risk Monitor

Depository Financial Institution Name and ABA Number | APPL ID: | Process Date: 07/16/03

Threshold Amounts: $100,000,000.00 | $50,000,000.00

| Rcvd Time | File ID | Total Debits | Total Credits | Debit Accumulator | Credit Accumulator | FedACH Agent | FedACH Agent Ext. | Totals Verified by | Released (mark w/ "r") | Rejected (mark w/ "r") | Action Time | Email Sent | FedACH Accepted | FedACH Rejected | DFI Contact |
|---|---|---|---|---|---|---|---|---|---|---|---|---|---|---|---|
| 7:00 | A | $50,000,000.00 | $20,000,000.00 | $50,000,000.00 | $20,000,000.00 | John J. | 9999 | Jane J. | r | | 7:05 | r | r | | N/A |
| 9:30 | B | $55,000,000.00 | $35,000,000.00 | $105,000,000.00 | $55,000,000.00 | John J. | 9999 | Jane J. | | | 9:45 | r | | r | John Doe |
| 11:20 | C | $20,000,000.00 | $20,000,000.00 | $125,000,000.00 | $75,000,000.00 | John J. | 9999 | Jane J. | r | | 11:42 | r | r | | N/A |
| 14:15 | D | $45,000,000.00 | $28,000,000.00 | $170,000,000.00 | $103,000,000.00 | Jane J. | 8888 | John J. | r | | 14:35 | r | r | | N/A |
| 20:15 | E | $4,000,000.00 | $3,000,000.00 | $174,000,000.00 | $106,000,000.00 | Mike F | 2222 | Sue P | | | 20:41 | r | | r | Jane Doe |

| | | | |
|---|---|---|---|
| Total Amount Received: | $174,000,000.00 | $106,000,000.00 | |
| Total Amount Released: | $119,000,000.00 | $71,000,000.00 | |
| FedACH Processed Total: | $99,000,000.00 | $51,000,000.00 | |
| Remaining Balance Available: | $1,000,000.00 | ($1,000,000.00) | File Totals Have Been Breached |

Figure 5

VALUE TRACKING AND REPORTING OF AUTOMATED CLEARING HOUSE TRANSACTIONS

RELATED PATENT APPLICATION

This application claims priority under 35 U.S.C. §119 to U.S. Provisional. Patent Application No. 60/507,294 filed Sep. 30, 2003 and entitled "Automated Clearing House Dollar Limit Tracking and Reporting Service." The subject matter of the priority application identified above is hereby fully incorporated herein by reference.

FIELD OF THE INVENTION

The present invention relates to processing automated clearing house ("ACH") financial transactions. Particularly, the present invention relates to tracking the accumulated value of ACH payments processed during a specified time period to prevent processing new payments that will result in exceeding a pre-established payment cap.

BACKGROUND OF THE INVENTION

One form of electronic funds transfer ("EFT") currently used domestically is known as direct payment (or direct deposit) instruments. A direct payment instrument is an electronically transmitted instruction to credit or debit a particular account. For example, a company can use direct payment to credit the accounts of its employees, customers, vendors, and beneficiaries. Direct payment instruments are becoming increasingly popular as conventional payment methods, such as checks, decrease in popularity. Because the transaction is performed electronically, direct payment instruments offer convenience and reliability. The electronic system that supports direct payment instruments in the United States is referred to as the Automated Clearing House ("ACH"). The ACH is a payments network that uses a batch processing, store-and-forward method for transfer of payment information. The payment information in an ACH transaction or item is an instruction to debit or credit a receiver's account. Receivers may be corporate entities or consumers. For example, a company can use an ACH payment to credit the accounts of its employees, customers, vendors, and beneficiaries. Use of the ACH network has grown significantly in the past few years as more corporations and consumers choose electronic alternatives for their transactions. The ACH provides a consistent and reliable payment alternative.

The ACH is a nationwide system supported by depository financial institutions and ACH operators, including the Federal Reserve Banks. The ACH network is governed by a set of rules administered by the National Automated Clearing House Association ("NACHA"). The ACH network provides clearing of generally small value, recurring, and one-time payments among banks that participate in the ACH network. Financial institutions collect transactions and package them in batched ACH files according to the NACHA rules for forwarding to other institutions via the ACH network.

ACH offers financial institutions, companies, consumers, and others an efficient, alternative to paper based payment methods. Throughout this specification, any reference to the term "company" is intended to be representative of the originator or receiver of electronic ACH payments and does not imply exclusion of other types of organizations or individuals. Transaction items are created by an originator and are delivered in batches to an originating depository financial institution ("ODFI"). The ODFI will transmit these batches in an ACH file to the ACH operator through its sending point. The ODFI may act as its own sending point, or it may contract with a third party or "remote" sending point, to electronically transmit the information in a file to an ACH operator. This third party or "remote" sending point may be a depository financial institution or a company providing processing services for depository financial institutions. The ACH operator can comprise the Federal Reserve Banks or another operator.

The file comprises batches, and each batch comprises one or more ACH transaction items pertaining to one originator and payment type. ACH transaction items are individual electronic debit payments or credit payments formatted to meet NACHA standards. Once received by the ACH operator, the transaction items are sorted, batched, and assembled in a file for delivery to a receiving depository financial institution ("RDFI"). The RDFI may act as its own receiving point, or it may contract with a third party, to electronically receive a file from the ACH operator. This third party may be a depository financial institution or a company providing processing services for depository financial institutions. The ACH operator may provide ACH accounting information in a machine-readable format to facilitate the automation of accounting information for participating DFIs.

The following provides definitions of the ACH system participants:

(1) ACH Operator: The Federal Reserve Banks or another operator which receives transaction items from an ODFI through its sending point, distributes the items to appropriate RDFIs or their third party receiving point(s), and can perform the settlement functions (crediting and debiting of accounts) for the affected financial institutions. In some cases, ACH operators may not perform the settlement function.

(2) Originator: A person or organization that agrees to initiate ACH entries into the payments system according to an arrangement with a receiver. The originator is usually a company that originates an ACH item to a consumer's account or another company's account. The originator is responsible for obtaining and retaining any required authorization from the receiver.

(3) Originating Depository Financial Institution ("ODFI"): A financial institution that receives the payment instructions from originators and forwards the items to the ACH operator.

(4) Receiver: A person or organization that has authorized an originator to initiate an ACH entry to the receiver's account at its RDFI.

(5) Receiving Depository Financial Institution ("RDFI"): A financial institution that receives ACH transactions from the ACH operator and posts them to the accounts of its customers (receivers).

(6) Receiving Point: The point to which files from the ACH operator are delivered for the RDFI. An RDFI may designate itself or another entity as the receiving point.

(7) Sending Point: The actual point from which a file is deposited with the ACH operator for the ODFI. The ODFI may designate itself or another entity as its sending point. The ODFI may have multiple sending points.

The following provides a description of the anatomy of a representative ACH file. ACH files comprise groups of ACH items in batches that must be in a specific sequence or the ACH operator will not process the file. Each ACH file has one file header, which primarily comprises immediate origin and destination information. Fields in the file header include the local ACH operator routing number, sending point or receiving point routing number, file date, file time, record block, destination name of the ACH operator, and origin name (the sending point or receiving point name).

Each batch comprises one or more similar ACH items and contains a batch header record that identifies the originator and the purpose of the entry and a batch control record that contains a count of the preceding entries. ACH files can comprise more than one batch. Depending on who creates the batch, either the ODFI or the originator will enter the data in the batch header. Fields in the batch header comprise the ODFI routing number, company name, company entry description (which prints on the customer statement), originator identification, batch number, effective entry date, and standard entry class code.

Each ACH batch also comprises a batch control record that announces the end of a batch. The batch control record comprises totals for the batch, such as number of items (payments), total dollar amounts, and a summation (algorithm) of the RDFI identification. Each batch must have a control record before another batch can begin. Throughout this specification, reference to a batch header can comprise information from a batch control record.

Each ACH item comprises an item detail record. The number of ACH items per ACH batch can be up to 999,999. Fields in the item detail record comprise the dollar amount, the receiver's RDFI account number and name, the transaction code for the receiver's type of account, trace number, and RDFI routing number. Each item detail record must be constructed in accordance with the NACHA record layout according to the Standard Entry Class Code of the batch.

Each ACH file also comprises a file control record at the end of the last batch in the ACH file. The file control record announces the end of the file and includes a summary of all of the batch control records. Throughout this specification, reference to a file header can comprise information from a file control record.

Each file header identifies the immediate origin (sending point or ACH operator) and destination (receiving point or ACH operator). A file may comprise batches and items for one or more ODFIs. A file can comprise items for numerous RDFIs. Typically, each batch comprises only one company's items. Input batches, which are being sent to the ACH operator by the ODFI, can comprise items for multiple RDFIs. Output batches, which are coming from the ACH operator, comprise items for only one RDFI.

A remote sending point can submit ACH payments to the ACH operator using an ODFI-owned routing number ("RTN") or through a remote connection using an electronic transaction identifier ("ETI"). An ETI is analogous to an RTN but designed for use by other than depository financial institutions. The submission on behalf of an ODFI presents a risk to the ODFI because the ODFI is responsible for the payments presented on its behalf.

Two examples of a remote sending point are a third party direct depositor (alternatively, a third party processor) and a remote originator. An ODFI may authorize a third party direct depositor to process all or a portion of the depository financial institution's ACH transactions on its behalf. That third party direct depositor then originates ACH credit and debit payments directly to the ACH operator on behalf of the ODFI. However, conventional ACH operator processing systems do not allow the ODFI to monitor and control the ACH payments originated on its behalf by a third party direct depositor. Accordingly, ODFIs desire to limit those transactions and to maintain control over the third party direct depositor.

A depository financial institution also may authorize a customer, such as an account holder, to originate ACH payments directly to the ACH operator. A customer with that authorization is a remote originator. For example, a depository financial institution can authorize a customer to originate ACH payments for the customer's payroll each month. The customer originates ACH credit payments to debit the customer's account at the depository financial institution and to credit the customer's employees' accounts. The customer forwards the originated ACH payments to the ODFI, which forwards the originated payments to the ACH operator for processing and, in some cases, settlement processing. The ODFI may not review the originated payments prior to forwarding those payments to the ACH operator. Conventional ACH operator processing systems do not allow the ODFI to monitor and control the ACH payments after receipt by the ACH operator. Accordingly, the depository financial institution needs to limit and control those payments to prevent the customer from overdrawing its account.

Accordingly, a need exists in the art for a method and system for tracking, controlling, and reporting ACH payments received for processing by an ACH operator. Particularly, a need exists in the art for tracking and reporting the accumulated value of ACH payments remotely originated for an ODFI over a specified time period. A further need exists in the art to pause processing of payments that will cause a pre-established payment cap for the specified time period to be exceeded and for allowing the ODFI to control whether to continue processing those payments. Yet another need exists in the art for monitoring ACH debit payments originated by a remote sending point on behalf of an ODFI.

SUMMARY OF THE INVENTION

The present invention comprises a value tracking and reporting tool for use with automated clearing house ("ACH") payments transmitted to an ACH operator on behalf of an originating depository financial institution ("ODFI"). One exemplary ACH operator is the Federal Reserve Banks operating their Automated Clearing House ("FedACH") service. The present invention can allow ODFIs to monitor and approve the dollar value of ACH payments submitted to the ACH operator on its behalf by a remote sending point. According to one aspect, the present invention can pause processing of ACH payments that will cause a pre-established payment cap for a specified time period to be exceeded and can allow the ODFI to control whether to continue processing those payments. Pausing processing of the ACH payments can avoid the time-consuming method of rejecting the ACH payments that will exceed the payment cap, or rejecting the entire file or batch containing those ACH payments, which payments then must be resubmitted in a new ACH file. In another aspect, the present invention also can allow an ODFI to monitor and control ACH debit payments submitted to the ACH operator by a remote sending point on behalf of the ODFI. Accordingly, the present invention can mitigate the risk of an ODFI having ACH volume submitted remotely on its behalf.

One aspect of the present invention relates to a method for value tracking of ACH payments processed by an ACH operator. An ACH file is received for ACH processing. The ACH file comprises ACH payments originated by a remote sending point on behalf of a sending customer. The method determines whether the ACH payments create an accumulated payment value that exceeds a pre-established payment cap. The accumulated payment value comprises a value of payments processed for the sending customer during a specified time period. The ACH payments are processed in response to a determination that the ACH payments do not create an accumulated payment value that exceeds the payment cap. The method determines whether to override the payment cap and to process the ACH payments in response to a determination that the ACH payments create an accumulated payment value that exceeds the payment cap.

Another aspect of the present invention relates to a method for value tracking of ACH payments processed by an ACH operator. An ACH file for ACH processing is received. The ACH file comprises an ACH batch that comprises a plurality of ACH payments originated by a remote sending point on behalf of a sending customer. A sum value of the ACH payments is added to a total value of prior payments previously processed for the sending customer to obtain an accumulated payment value. The accumulated payment value is compared to a pre-established payment cap to determine whether the accumulated payment value exceeds the payment cap. The payments are processed in response to a determination that the accumulated payment value does not exceed the payment cap. The method determines whether to override the payment cap and to process the payments in response to a determination that the accumulated payment value exceeds the payment cap.

Yet another aspect of the present invention relates to a method for value tracking of ACH payments processed by an ACH operator. The ACH operator receives an ACH file for ACH processing. The ACH file comprises a plurality of ACH debit payments originated by a remote sending point on behalf of a sending customer. A sum value of the ACH debit payments is added to a total value of prior debit payments previously processed for the sending customer during a specified time period to obtain an accumulated payment value. The method determines whether the accumulated payment value exceeds a pre-established debit payment cap. The method also determines whether to override the payment cap and to process the debit payments in response to a determination that the accumulated payment value exceeds the debit payment cap.

Another aspect of the present invention relates to a method for value tracking of ACH payments processed by an ACH operator. The ACH operator receives an ACH file for ACH processing. The ACH file comprises a plurality of ACH payments originated by a sending point on behalf of a sending customer. The method determines whether a value of the ACH payments exceeds a pre-established payment cap. Then, the method pends the ACH payments in response to a determination that the value of the ACH payments exceeds the payment cap. The method also can determine whether to override the payment cap and to process the ACH payments in response to a determination that the value of the ACH payments exceeds the payment cap.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

The present invention can monitor automated clearing house ("ACH") payments to allow an originating depository financial institution ("ODFI") to control processing (including settlement processing) of ACH payments originated on its behalf by a remote sending point. The invention maintains an accumulated payment value for all payments processed for the ODFI during a specified time period. Then, the invention updates the accumulated payment value based on new payments received and compares the updated accumulated payment value to a pre-established payment cap. If the updated accumulated payment value exceeds the payment cap, then the invention provides the ODFI with an opportunity to override the payment cap and to allow processing of the payments. Accordingly, the ODFI can monitor and control payments originated on its behalf.

The present invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

In an exemplary embodiment according to the present invention, a method comprises the following steps to monitor the dollar value of ACH operator volume initiated by a remote sending point on behalf of an ODFI and forwarded to an ACH operator:

1. Determine whether an incoming ACH file or batch is designated for value tracking and reporting services.
2. If not, then process the undesignated ACH payments.
3. If yes, then pend communication of the designated sending point file or batch at a preprocessing point. "Preprocessing" means prior to processing the file or batch.
4. Sum debit payment values and credit payment values, respectively, in the file or batch for a given ODFI by settlement date, process date, or exposure period.
5. Add the summed debit and credit payment values to the running debit and credit payment totals, respectively, for settlement date, process date, or exposure period to obtain an accumulated debit value and an accumulated credit value. The running debit and credit payment totals comprise a total value of prior debit and credit payments, respectively, for the ODFI previously processed during the specified time period.
6. Compare the accumulated debit and credit payment values to pre-established value payment caps (debit and/or credit) to determine the process status of a given file or batch.
7. If the accumulated debit and credit payment values for a given settlement date, process date, or exposure period do not exceed the respective debit or credit value payment cap, then release the file or batch for processing and settlement.

8. If the accumulated debit or credit payment values for a given settlement date, process date, or exposure period exceed the respective debit or credit value payment cap, then notify the ODFI that the pending payments will exceed the cap.

9. If the ODFI approves overriding the debit or credit payment cap and processing of the cap-exceeding ACH payments, then release the file or batch for processing and settlement.

10. If the ODFI does not approve overriding the payment cap to process the cap-exceeding payments, then reject the file or batch.

The above steps can monitor and approve the dollar value of ACH payments initiated by a remote sending point on behalf of an ODFI. In an exemplary embodiment, the file can comprise information identifying the remote sending point and the ODFI responsible for the ACH payments. In another exemplary embodiment, the remote sending point can transmit an ACH file comprising ACH payments for only one ODFI. In another exemplary embodiment, the remote sending point can communicate an ACH file comprising batches of ACH payments for multiple ODFIs. In that case, each batch can comprise information identifying the specific ODFI responsible for respective batches of ACH payments. Accordingly, the value tracking and reporting system can sum ACH credit and debit payments received from a specific remote sending point for a specific ODFI. Then, the system can verify the total value of ACH payments in the batch or file with respect to a credit and/or debit payment cap, as discussed above.

In another exemplary embodiment, the remote sending point can communicate all ACH payments for a specific ODFI using a unique identification number ("ID"). That process can apply at the file or batch level. The value tracking system can correlate the unique identification number to a remote sending point and a corresponding ODFI. Then, the method can determine whether the ODFI desires value tracking by verifying the ODFI's subscription to that service. Next, the value tracking and reporting system can sum ACH credit and debit payments, respectively, received from a specific remote sending point for a specific ODFI. Then, the system can verify the total value of ACH payments in the batch or file with respect to a credit and/or debit payment cap, as discussed above.

To prevent the remote sending point from circumventing the ID restriction by originating activity for the ODFI under an additional ID, the ODFI can contract with the remote sending point to use a single ID. However, the ODFI may not be able to control the ID used by the remote sending point, and the ODFI relies on the remote sending point's good will to process its volume under a single ID. Accordingly, the ODFI may not accept the risk of relying on the remote sending point's good will to use a single ID. In an exemplary embodiment, the value tracking method can require the remote sending point to initiate all ACH payments for a specific ODFI through a dedicated node and sending point routing number ("RTN"). In that case, the sending point cannot change IDs for a specific ODFI. The ACH files can be identified by the network origination location. The security protocol mechanism attached to the remote sending point's communications protocol connection can be used to allow the remote sending point to send only specific IDs via a particular circuit. The ID of the file can be validated to the remote sending point's process ID. Accordingly, the value tracking system can require the sending point to use a dedicated node and sending point RTN to transmit work on the ODFI's behalf. Then, the method can determine whether the ODFI desires value tracking by verifying the ODFI's subscription to that service. Next, the value tracking and reporting system can sum ACH credit and debit payments, respectively, received from a specific remote sending point for a specific ODFI. Then, the system can verify the total value of ACH payments in the batch or file with respect to a credit and/or debit payment cap, as discussed above.

In another exemplary embodiment, the value tracking system can sum all ACH payments for an ODFI from multiple remote sending points. In that case, the credit and debit payment caps can control the aggregate value of all ACH payments for an ODFI received from multiple sending points.

Processing of the ACH payments comprises determining whether to accept ACH payments for settlement. Processing involves examining the information in the ACH file to determine whether all required information is present and in the required format. First, a processing module of the ACH operator examines the file header information to determine if it conforms to the NACHA required format and content. If the file header information conforms to the required information, then the processing module accepts the file. In that case, the processing module performs a similar examination of each batch header in the file to determine whether to accept the respective batches. If the batch header information conforms to the required information, then the processing module accepts the respective batch. Then, the processing module examines the item detail record for each item in the accepted batches to determine whether it conforms to the required information. If yes, then the processing module accepts the respective items for settlement. In an exemplary embodiment, the processing module also can perform the settlement function to settle the accepted ACH items. Settlement involves debiting and crediting the appropriate ODFI and RDFI accounts related to each accepted ACH item.

If the file header, batch header, or item detail record do not conform to the required information, then the processing module rejects the respective file, batch, or item. In that case, the processing module will not settle the rejected files, batches, or items. Accordingly, the sending customer must correct the errors in the information and resubmit the rejected file, batch, or item in a new file for acceptance.

Referring to the drawings, in which like numerals represent like elements, additional aspects of the exemplary embodiments will be described.

Figure 1:
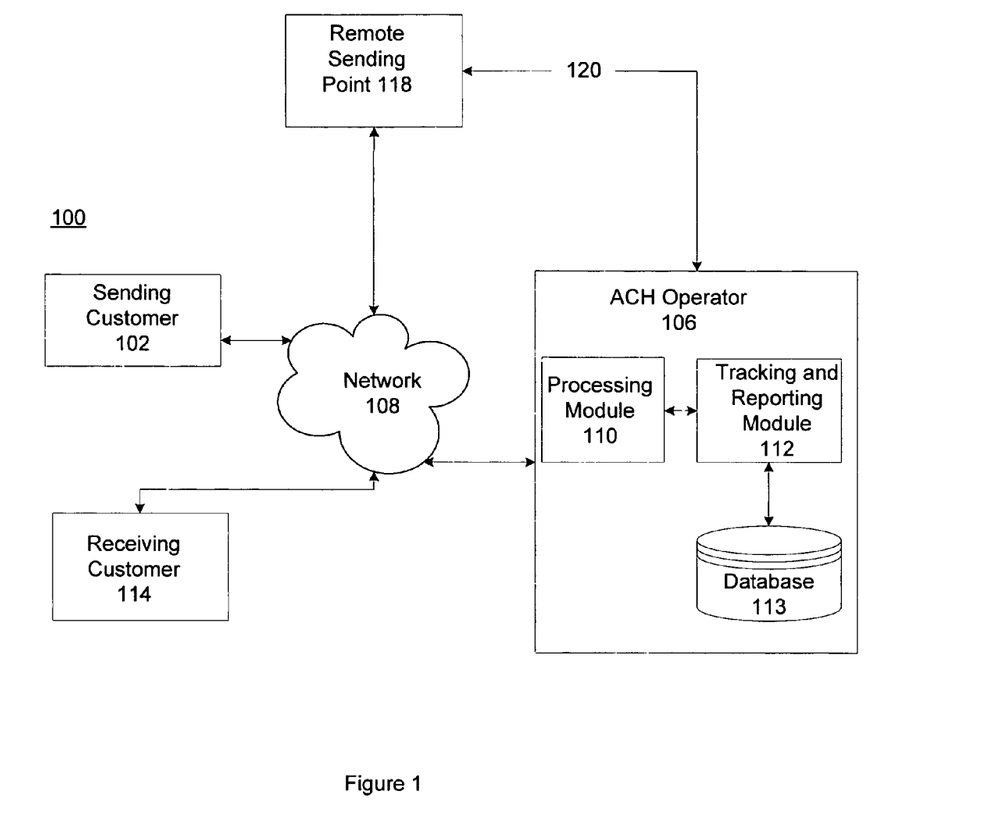
FIG. 1 is a block diagram depicting a system for value tracking of automated clearing house payments processed by an ACH operator according to an exemplary embodiment of the present invention.

FIG. 1 is a block diagram depicting a system 100 for value tracking of ACH payments processed by an ACH operator 106 according to an exemplary embodiment of the present invention.

Value tracking involves tracking the value of ACH payments over a specified time period to prevent exceeding a pre-established payment cap for the value of those payments. In a typical ACH transaction, a sending customer 102 initiates an ACH payment with a receiving customer 114 by forwarding the ACH payment to the ACH operator 106. The sending customer 102 comprises an ODFI that sends payments on behalf of an originator to the ACH operator 106 either directly or through a remote sending point. The receiving customer 114 comprises an RDFI that receives payments from the ACH operator 106 either directly or through a remote receiving point. The sending customer 102 also can authorize a remote sending point 118 to originate ACH payments on its behalf and to forward those ACH payments directly to the ACH operator 106. The remote sending point 118 communicates each ACH payment as an ACH item in an ACH file. Each ACH file comprises one or more ACH batches that each comprise one or more ACH payment items.

As shown in FIG. 1, the various parties to the transaction can communicate ACH files and other information via a secure session over a distributed computer network 108. For example, the remote sending point 118 can communicate the electronic ACH file to the ACH operator via the network 108. In exemplary embodiments, the distributed computer network 108 can comprise the Internet, a virtual private network, a computer interface protocol, or other suitable network. Alternatively, the various parties can communicate the ACH files and other information via a secure, direct communication link 120. For example, the remote sending point 118 can communicate the electronic ACH files to the ACH operator via the direct communication link 120. In an exemplary embodiment, the link 120 can comprise a direct frame relay connection.

Figure 2:
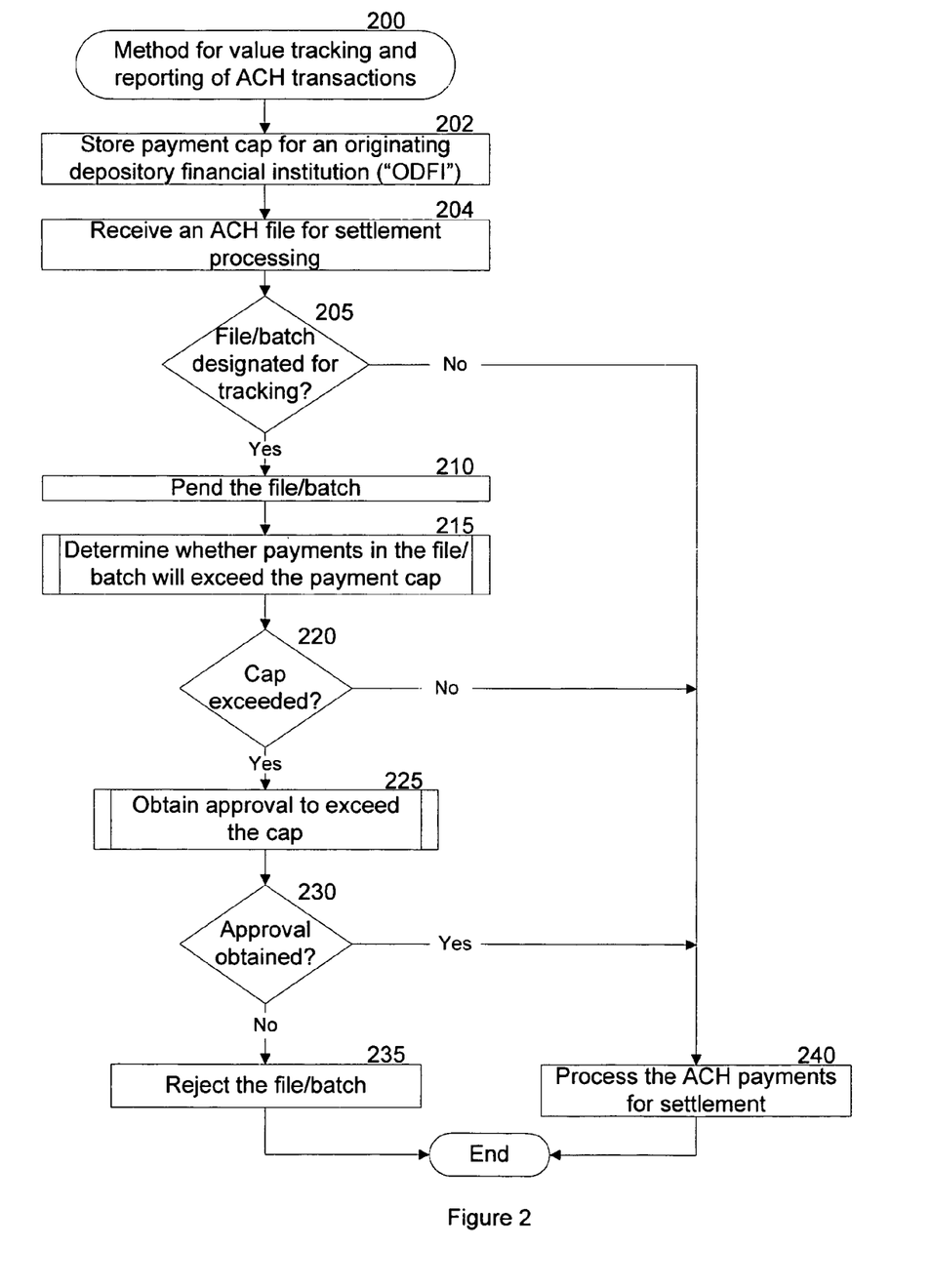
FIG. 2 is a flow chart depicting a method for value tracking and reporting of ACH transactions according to an exemplary embodiment of the present invention.

FIG. 2 is a flow chart depicting a method 200 for value tracking and reporting of ACH transactions according to an exemplary embodiment of the present invention. The method 200 will be described with reference to FIGS. 1 and 2.

In step 202, the ACH operator 106 stores credit and debit payment caps for one or more sending customers 102 in the database 113. The sending customers 102 can establish their respective credit and debit payment caps to limit credit risk associated with ACH origination.

In step 204, the processing module 110 of the ACH operator 106 receives an ACH file communicated from the remote sending point 118 for processing. The ACH file comprises one or more batches, each comprising one or more ACH payment items ("payments").

In step 205, the processing module 110 determines whether the ACH file, or one or more batches within the ACH file, is designated for value tracking and reporting. The processing module 110 can make the determination of step 205 in any suitable manner. In an exemplary embodiment, the processing module 110 can search the file header or batch header for a data string that indicates the corresponding file or batch is designated for value tracking and reporting. In an alternative exemplary embodiment, the processing module 110 can identify the sending customer 102 responsible for the payments based on the name, routing number or other identification number, or other suitable information of the sending customer 102 within the ACH file or ACH batch. Then, the processing module 110 can determine whether the sending customer subscribes to the value tracking and reporting service by comparison of the sending customer 102 to a subscriber list. If the processing module 110 matches the information of the sending customer 102 with information on the subscriber list, then the processing module 110 will perform value tracking and reporting of the ACH payments of the sending customer 102.

In another exemplary embodiment, the sending customer 102 can request file tracking and reporting of ACH payments for a particular originator of the sending customer 102. For example, the sending customer 102 can provide its own identifying information combined with the identifying information of the originator to the ACH operator 106. The ACH operator 106 can store that information in the subscriber list. In exemplary embodiments, the originator information can comprise an account number, a customer/company number, or other information suitable to identify the originator. By including the combination of sending customer 102 information and originator information in the headers of ACH files or batches, the processing module 110 can identify payments for file tracking and reporting based on the particular originator of the sending customer 102.

Thus, file tracking and reporting can be performed for various entities related to a sending customer 102. In an exemplary embodiment, the method can apply to ACH payments of the sending customer 102, regardless of the entity that forwards the payments to the ACH operator 106. For example, file tracking and reporting can be performed for ACH payments forwarded to the ACH operator 106 by the particular remote sending point 118 on behalf of the sending customer 102. Alternatively, file tracking and reporting can be performed for ACH payments forwarded to the ACH operator 106 by the sending customer 102 without using the remote sending point 118. In another exemplary embodiment, the method can apply to ACH payments of a particular originator of the sending customer 102 when those payments are forwarded to the ACH operator 106 by the sending customer 102 or the remote sending point 118. In any case, the processing module 110 determines in step 205 whether the ACH payments in the file or batch are designated for file tracking and reporting.

If the processing module 110 determines in step 205 that the file or batch is not designated for value tracking and reporting, then the method branches to step 240 to process the ACH payments. The processing module 110 processes the ACH file, including the batches and payments in the file, to determine whether to accept the ACH file, the ACH batches, and each ACH payment. To determine whether to accept the ACH file, the processing module 110 examines the NACHA required information in the file header to determine if all of the required information is present and in the proper format. Another part of the validation process examines if the relationships between the parties in the transactions match the legal relationships as defined in an ACH customer directory database. If the NACHA required information is present and properly formatted and the relationships are correct, then the processing module 110 accepts the file for ACH transaction processing of the batches included therein.

The processing module 110 also processes each ACH batch in the ACH file to determine whether to accept each batch. To determine whether to accept an ACH batch, the processing module 110 examines the NACHA required information in the batch header to determine if all of the required information is present and in the proper format and to determine if the relationships between the parties in the transactions match the legal relationships as defined in the ACH customer directory database. If the NACHA required information is present and properly formatted and the relationships are correct, then the processing module 110 accepts the batch for ACH transaction processing of the payments included therein.

The processing module 110 also processes each ACH payment in each ACH batch to determine whether to accept each payment. To determine whether to accept an ACH payment, the processing module 110 examines the NACHA required information in the payment detail record to determine if all of the required information is present and in the proper format and that the relationships are correct. If the NACHA required information is present and properly formatted and the relationships are correct, then the processing module 110 accepts the payment for ACH transaction processing and settlement.

For each ACH payment, the processing module 110 records a process date on which the processing module 110 will perform the payment processing discussed above. Additionally, the processing module 110 records a settlement date for each ACH payment. The settlement date is the date on which the appropriate accounts are credited or debited to settle the ACH payment. The settlement date initially comprises the future date of settlement until the accounts are debited and credited. Then, the settlement date reflects the actual settlement date of the ACH payment.

Referring back to step 205, if the processing module 110 determines that the file or batch is designated for value tracking and reporting, then the method branches to step 210. In step 210, the processing module 110 pends the file or each individual batch designated for value tracking. In an exemplary embodiment, the processing module 110 pends the designated file or batch prior to the start of processing of the payment included therein. In an alternative exemplary embodiment, the processing module 110 can pend the designated file or batch during that processing.

In step 215, the tracking and reporting module 112 determines whether the credit and debit payments in the file or in the individual batch will exceed the respective payment cap established by the sending customer 102 responsible for those payments. Step 215 is discussed in more detail below with reference to FIG. 3.

In step 220, the tracking and reporting module 112 determines the next processing action based on whether the payments will exceed the payment cap. If the credit or debit payments within the file or batch will not cause the payment cap to be exceeded, then the method branches to step 240 to process the ACH payments. If the tracking and reporting module 112 determines in step 220 that the payments in the file or batch will cause the payment cap to be exceeded, then the method branches to step 225.

In step 225, the ACH operator 106 obtains approval to exceed the payment cap from the sending customer 102 responsible for the payments. Step 225 is discussed in more detail below with reference to FIG. 4. Then, in step 230, the method 200 determines whether the sending customer 102 approved exceeding the payment cap. If the sending customer 102 approved exceeding the payment cap, then the method branches to step 240 to process the ACH payments within the file or batch. If the method 200 determines in step 230 that the sending customer 102 did not approve exceeding the payment cap, then the method branches to step 235. In step 235, the tracking and reporting module 112 rejects the file, and the processing module 110 communicates rejection of the file to the remote sending point 118.

Figure 3:
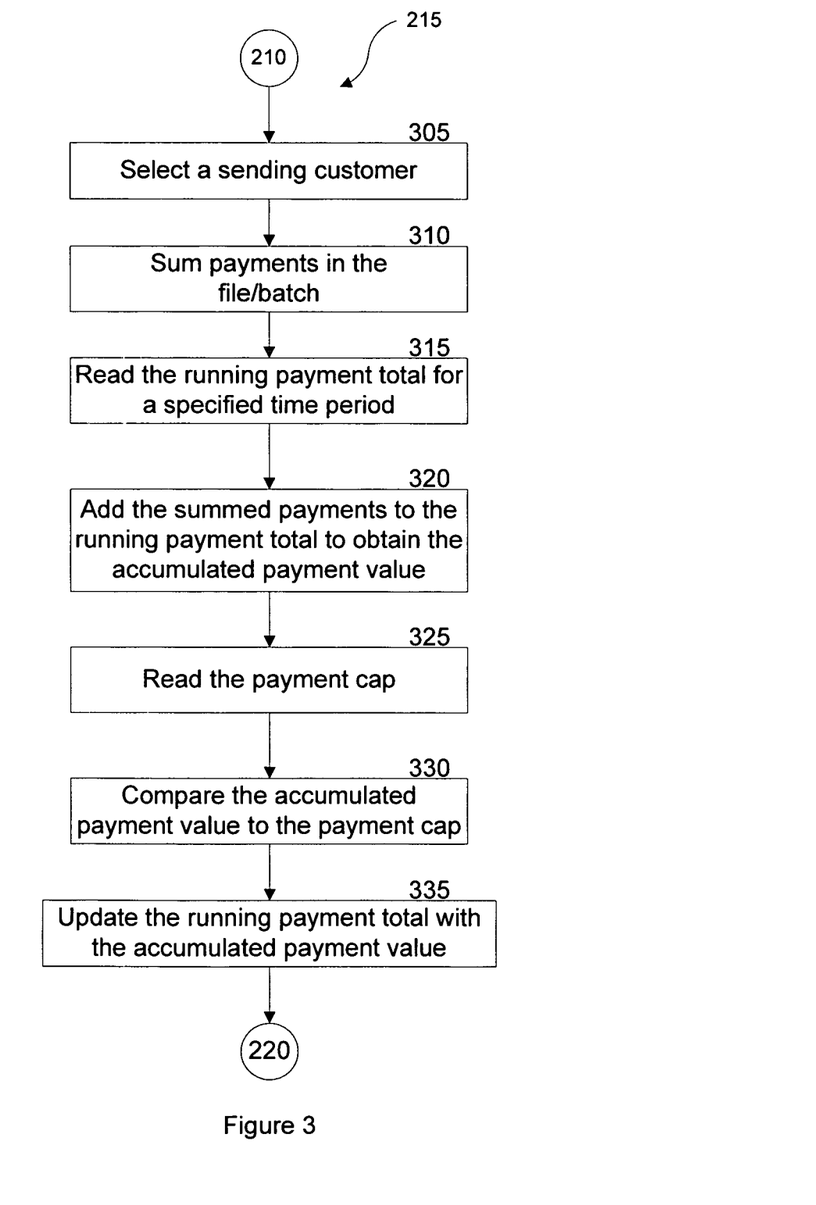
FIG. 3 is a flow chart depicting a method for determining whether payments in a file or batch will exceed a pre-established payment cap according to an exemplary embodiment of the present invention.

FIG. 3 is a flow chart depicting a method 215 for determining whether payments in a file or batch will exceed a pre-established payment cap according to an exemplary embodiment of the present invention, as referred to in step 215 of FIG. 2. The method 215 will be described with reference to FIGS. 1 and 3.

In step 305, the tracking and reporting module 112 selects a sending customer 102 responsible for credit or debit payments within the file. If the ACH file comprises batches of ACH credit or debit payments for only one sending customer 102, then the tracking and reporting module 112 can select that sending customer 102. If the ACH file comprises batches of ACH credit or debit payments for more than one sending customer 102, then the tracking and reporting module 112 selects a sending customer 102 responsible for the payments in one of the batches in the ACH file. Then, the tracking and reporting module 112 continues the method 215 for the selected sending customer 102 and can repeat the method 215 for each sending customer 102. In any event, the method 215 proceeds to step 310 for the selected sending customer 102.

In step 310, the tracking and reporting module 112 sums the credit payments in the file or batch and separately sums the debit payments in the file or batch.

In step 315, the tracking and reporting module 112 reads a running credit payment total and a running debit payment total for a specified time period from the database 113. The running credit payment total is a sum of all credit payments processed for the sending customer 102 during the specified time period. The running debit payment total is a sum of all debit payments processed for the sending customer 102 during the specified time period. In an exemplary embodiment, the running payment totals can comprise a sum of all credit or debit payments processed for the sending customer, which payments were originated by a particular remote sending point. In another exemplary embodiment, the running payment totals can comprise a sum of all credit or debit payments processed for the sending customer, which payments were originated by multiple remote sending points. In another exemplary embodiment, the running payment totals can comprise a sum of all credit or debit payments processed for the sending customer, which payments were originated by one or more remote sending points and/or the sending customer. Accordingly, the payment totals can reflect payments forwarded to the ACH operator from the sending customer, the sending customer and one or more remote sending points, a single remote sending point, or multiple remote sending points. The running payment totals are set to zero at the beginning of the specified time period. Accordingly, the running payment totals equal zero for the first set of ACH payments processed during the specified time period.

The specified time period can comprise any suitable time period for which the sending customer 102 desires to establish a credit or debit payment cap. In an exemplary embodiment, the specified time period can comprise the processing date of the ACH payments. In an alternative exemplary embodiment, the specified time period can comprise a settlement date of the ACH payments.

In another alternative exemplary embodiment, the specified time period can comprise an exposure period of the ACH payments, which is the time between the process date and the settlement date. The exposure period encompasses ACH payments that have been processed but not settled and the return risk associated with debit payments. In an exemplary embodiment, the exposure period can comprise two days for processed credit payments and three days for processed debit payments. An account holder can initiate an ACH credit payment without having sufficient funds in the account to cover the payment and later can deposit sufficient funds before the settlement date. However, the ACH operator will debit the sending customer 102 for the ACH payment on the settlement date, regardless of whether the account holder has sufficient funds in its account. An account holder can initiate an ACH debit payment, which adds funds into its account. Those funds may be returned in the event of a dispute or insufficient funds in the receiving account. Accordingly, the sending customer 102 may desire to monitor the amount of unsettled, processed payments to monitor its exposure for those payments.

In step 320, the tracking and reporting module 112 adds the summed credit payments to the running credit payment total to obtain the accumulated credit payment value. The tracking and reporting module 112 also adds the summed debit payments to the running debit payment total to obtain the accumulated debit payment value.

In step 325, the tracking and reporting module 112 reads the payment cap stored in step 202 (FIG. 2) for the sending customer 102 selected in step 305. The tracking and reporting module 112 can read a credit payment cap and/or a debit payment cap established by the sending customer 102. Then, in step 330, the tracking and reporting module 112 compares the accumulated payment value to the payment cap to determine whether the accumulated payment value exceeds the payment cap. The tracking and reporting module 112 can make that comparison and determination for either the credit payments or the debit payments.

In step 335, the tracking and reporting module 112 updates the running payment total with the accumulated value and stores the updated running payment total in the database 113. The method then proceeds to step 220 (FIG. 2).

Figure 4:
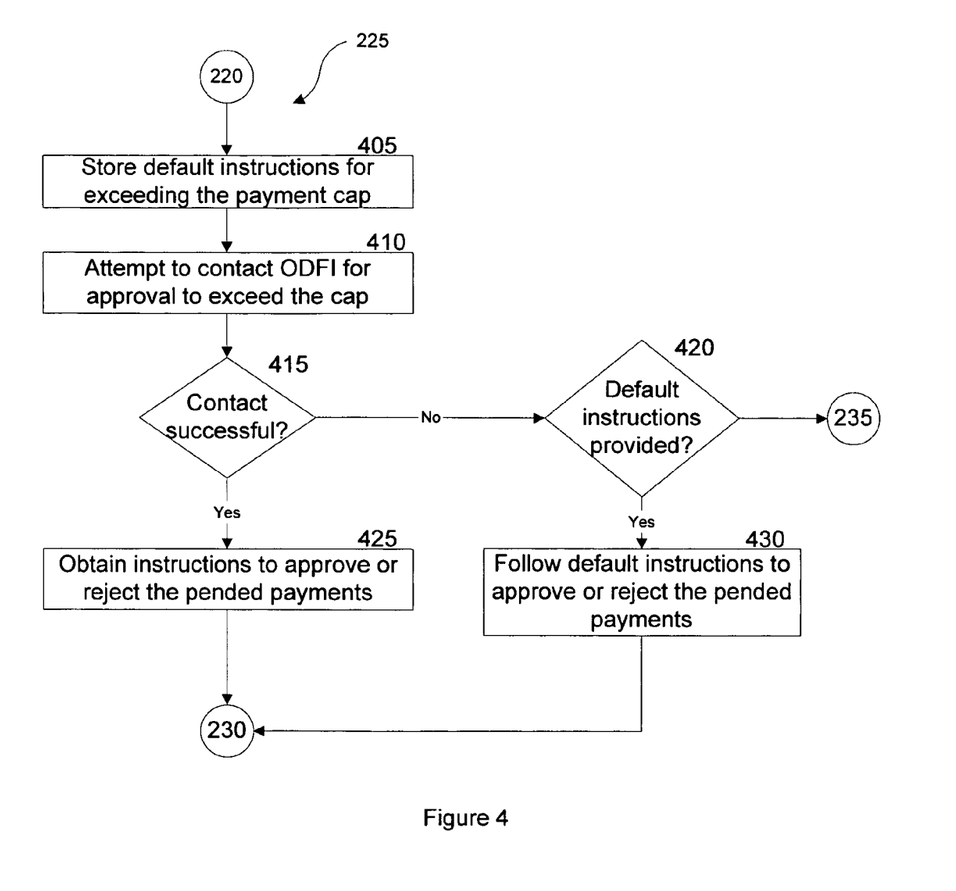
FIG. 4 is a flow chart depicting a method for obtaining ODFI approval to exceed an established payment cap according to an exemplary embodiment of the present invention.

FIG. 4 is a flow chart depicting a method 225 for obtaining sending customer approval to exceed an established payment cap according to an exemplary embodiment of the present invention, as referred to in step 225 of the FIG. 2. The method 225 will be described with reference to FIGS. 1 and 4.

In step 405, the ACH operator 106 stores a sending customer's 102 default instructions for exceeding the payment cap in the database 113. The sending customer 102 can establish default instructions to define ACH operator 106 actions in case the ACH operator 106 cannot contact the sending customer 102 for approval to exceed a payment cap.

In step 410, the ACH operator 106 attempts to contact the sending customer 102 for approval to exceed the established payment cap. The ACH operator 106 can contact the sending customer 102 via any suitable method. According to an exemplary embodiment, the tracking and reporting module 112 can generate an e-mail requesting authorization to exceed the payment cap and can forward that e-mail to the sending customer 102 via the network 108. In an alternative exemplary embodiment, the ACH operator 106 can contact the sending customer 102 via telephone or e-mail for approval to exceed the payment cap.

In step 415, the method 200 determines whether the ACH operator 106 successfully contacted the sending customer 102. If not, then the method 225 branches to step 420, discussed below. If the ACH operator 106 successfully contacted the sending customer 102, then the method branches to step 425.

In step 425, the ACH operator 106 obtains instructions from the sending customer 102 to approve exceeding the payment cap or to reject the pended payments. The sending customer 102 can provide its instructions by any suitable method. In an exemplary embodiment, the sending customer 102 can verbally instruct the ACH operator 106 via telephone or other communications device to approve exceeding the payment cap or to reject the pending payments. In an alternative exemplary embodiment, the sending customer 102 can instruct the ACH operator via e-mail to the ACH operator 106 or directly to the tracking and reporting module 112. The method 225 then proceeds to step 230 (FIG. 2).

Referring back to step 420, if the ACH operator 106 could not successfully contact the sending customer 102 in step 415, then the method determines in step 420 whether the ACH operator 106 has default instructions from the sending customer 102 stored in the database 113. If the sending customer 102 has not provided default instructions, then the method 225 branches to step 235 (FIG. 2) to reject the pended payments. If the sending customer 102 has provided default instructions, then the method branches to step 430. In step 430, the ACH operator 106 follows the default instructions to approve or reject the pended payments. The method then proceeds to step 230 (FIG. 2).

The following text describes another alternative exemplary embodiment of the present invention. In that embodiment, each file or batch of ACH payments included in the file tracking and reporting service can be identified by a header that includes an identifier. For example, the identifier can comprise a four letter ID such as "XXXX." The value tracking and reporting method can provide the file tracking and reporting service with respect to ACH payments in files or batches identified by the XXXX identifier.

The sending customer 102 can specify in writing, a daily aggregate value for all debit items (the "debit payment cap"), and/or a daily aggregate limit for all credit items (the "credit payment cap"), that may be originated using the XXXX identifier during a specified time period. Thereafter, the sending customer 102 can provide the ACH operator with a written instruction to increase or decrease the debit or credit payment cap.

After the ACH operator receives an ACH file originated using the XXXX identifier, the ACH operator can send a report of the aggregate running total dollar amount of all ACH debit and/or credit payments originated using the XXXX identifier during the specified time period, including amounts in the file or batch just originated, to each of the authorized representatives designated by the sending customer 102 for receiving such report via facsimile or e-mail. The report can be in the exemplary form of a file tracking and reporting table.

Figure 5:
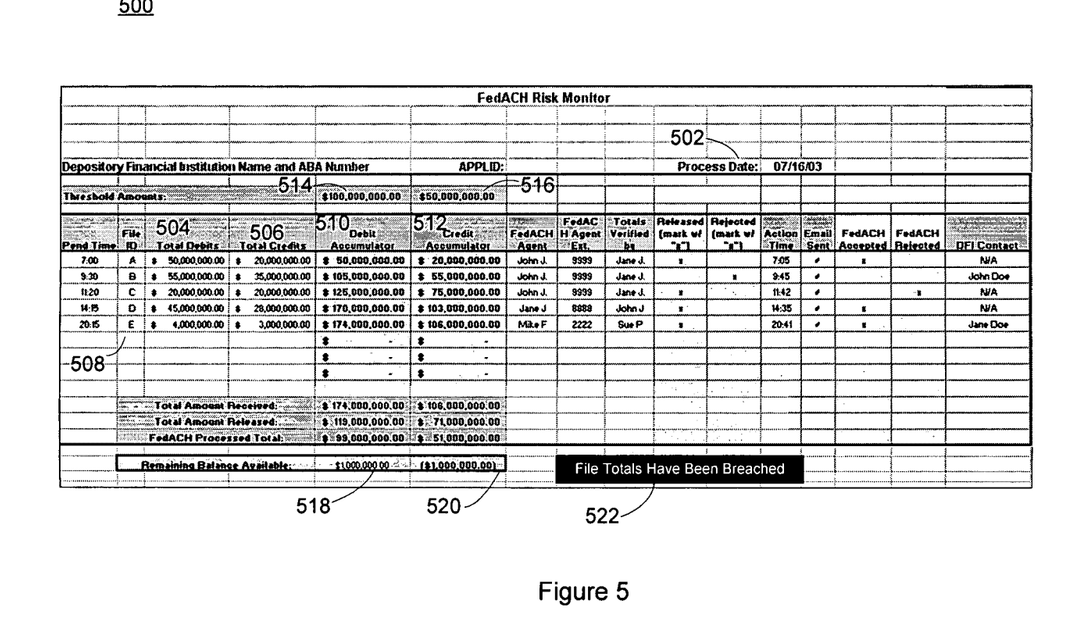
FIG. 5 illustrates a file tracking and reporting table according to an exemplary embodiment of the present invention.

FIG. 5 illustrates a file tracking and reporting table 500 according to an exemplary embodiment of the present invention. The table 500 comprises the specified time period 502, which is a process date in the exemplary embodiment illustrated in the table 500. The table 500 also comprises sum totals of debit and credit payments 504, 506 included in each file 508, accumulated debit and credit payment values 510, 512 for the payments in the files 508, and the pre-established debit and credit payment caps 514, 516. The remaining debit and credit balances available 518, 520 indicate whether the respective accumulated payment values 510, 512 exceed the respective pre-established debit and credit payment caps 514, 516, respectively. If so, then the table 500 displays a warning message 522 to indicate that occurrence.

For each ACH file or batch comprising ACH payments that exceed the credit cap or the debit cap for a sending customer 102, the ACH operator 106 can contact the authorized representatives designated by the sending customer 102 for receiving notice of the breach of the debit cap or credit cap (each a "Notice Contact"), by telephone on a recorded line, by e-mail, or by other suitable means, and can inform the Notice Contact that the ACH operator 106 has received a file comprising ACH payments that exceed the applicable credit cap or debit cap. The sending customer 102 also can designate authorized representatives to decide on behalf of the sending customer 102 whether to instruct the ACH operator to override the credit or debit cap and to release a file or batch for processing or whether to reject a file or batch (each an "Approval Contact"). In an exemplary embodiment, the decision to release or reject can be made with respect to an entire file and not with respect to batches or payments within a file. In an alternative exemplary embodiment, the decision to release or reject also can be made with respect to batches within a file and with respect to payments within a batch.

The sending customer 102 can provide written instructions to the ACH operator defining default procedures in the event timely approval for rejection or processing is not received. If instructions to override a cap and to release a pended file for processing or to reject the pended file are not received from an Approval Contact by a specified deadline, the ACH operator can follow the written instruction provided by the sending customer 102.

The exemplary value tracking methods discussed above comprise rejecting the ACH payments when the accumulated payment value exceeds the payment cap. In an exemplary embodiment, a value tracking and reporting method can reject only a portion of the ACH payments which causes the accumulated payment value to exceed the payment cap, and the method can process the remaining payments. In that regard, the method can reject individual payments within a batch and can process the remaining payments within the batch. Alternatively, the method can reject one or more of a number of batches in a file and can process the remaining batches within the file.

The exemplary value tracking methods of the present invention can provide several advantages. Specifically, the system can reduce sending customer 102 involvement and can reduce processing time. For example, the sending customer 102 can authorize overriding a cap to process an ACH file or batch that will exceed a credit or debit cap without actually changing the credit or debit cap value. Accordingly, sending customer 102 involvement is reduced because the sending customer 102 does not actually have to change the affected cap, and the sending customer 102 does not have to reset the cap after processing of the cap-exceeding ACH payments. Additionally, processing of the ACH payments does not have to wait for the sending customer 102 to change the appropriate cap.

The "pre-processing" exemplary embodiment also can reduce processing delays. By pending incoming files prior to processing the ACH payments (i.e., at a preprocessing stage), processing delays can be avoided. The system can examine the pended files to determine if ACH payments contained therein will exceed a credit or debit cap. If the ACH payments will exceed a credit or debit cap, then the sending customer 102 is contacted for approval to override the cap prior to processing the cap-exceeding payments. In other words, the exemplary value tracking system will not begin ACH processing of a file or batch comprising cap-exceeding ACH payments. Accordingly, the system can avoid stopping and restarting of ACH settlement processing. Each file, batch, and item can be processed a single time.

In another exemplary embodiment, ACH files and batches can be examined during processing to determine if the ACH payments will exceed a credit or debit cap. If the ACH payments will exceed a credit or debit cap, then the ACH file or batch can be pended until override approval is obtained or until rejected by the sending customer 102. After receiving sending customer 102 approval to override a cap, the system can continue processing of the cap-exceeding file or batch. While not providing the pre-processing advantages discussed above, this exemplary embodiment still can reduce sending customer 102 involvement by not requiring an actual change in the credit or debit cap to process the cap-exceeding ACH payments.

The exemplary value tracking systems and methods can report ACH payment activity directly to the sending customer 102 without notifying the remote sending point 118. Accordingly, processing delays can be further reduced by directly seeking sending customer 102 approval to override a credit or debit cap. If the system reported cap-exceeding payments to the remote sending point 118, then the sending customer 102 would be unaware of attempts to exceed the cap. In the event the remote sending point 118 was unable to reduce its payments to accommodate the cap, the additional step of contacting the sending customer 102 to request a cap limit extension would be required. Thereafter, the sending customer 102 would have to contact the ACH operator 106 to authorize an override of the credit or debit cap. Finally, the remote sending point 118 must contact the ACH operator 106 with instructions to resubmit the cap-exceeding ACH payments for processing. Those additional notification/authorization steps can delay processing of the cap-exceeding ACH payments.

A debit cap is significantly different from a credit cap. Additionally, a debit cap is contrary to conventional wisdom for monitoring ACH payments. The conventional wisdom for monitoring ACH payments involves controlling ACH credits for which the sending customer 102 is responsible. The sending customer 102 will make payments out of its accounts as payment to the respective receiver of each ACH credit. Accordingly, the sending customer 102 desires to monitor and control the amount of outgoing payments necessary to cover the ACH credits.

On the other hand, an ACH debit payment involves ACH debits issued to a receiver on behalf of the sending customer 102. The receiver will make payment out of its accounts to the sending customer 102 for the ACH debits. Debit payments provide incoming money to the sending customer 102. Accordingly, limiting the amount of incoming money received from ACH debit payments is contrary to the conventional wisdom of protecting outgoing money transactions.

However, a sending customer 102 may desire to limit ACH debit payments in anticipation of a receiver returning those payments. For example, a sending customer 102 originator can sell goods over the Internet to buyers. To receive payment, the sending customer 102 originator or seller issues ACH debit payments to the buyers' bank accounts at receiving banks. The receiving banks are charged/debited for the ACH debit and the sending customer 102 is credited. Then, the sending customer 102 credits the seller's account. If the buyer places a stop payment on the transaction, the receiving bank returns the ACH debit payment to the sending customer 102. The sending customer 102 will then attempt to retrieve the money from the seller's account as required by the return from the receiving bank. If the seller has closed the account or has withdrawn the money, then the sending customer 102 alone is responsible for the returned ACH debit. As a result, sending customers 102 may desire to cap ACH debits originated by remote sending points to limit their exposure to returned ACH debit payments.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A computer-implemented method for value tracking of automated clearing house ("ACH") payments processed by an ACH operator, comprising the steps of:

receiving via a computer at the ACH operator an ACH file for ACH processing by the ACH operator, the ACH file comprising at least one ACH payment originated by a remote sending point on behalf of an originating depository financial institution ("ODFI") and forwarded to the ACH operator by the remote sending point;

determining via the computer whether the at least one ACH payment creates an accumulated payment value for ACH payments processed for the ODFI during a specified time period that exceeds a pre-established payment cap;

processing the at least one ACH payment in response to a determination that the at least one ACH payment does not create an accumulated payment value that exceeds the payment cap; and determining whether to override the payment cap and to process the at least one ACH payment in response to a determination that the at least one ACH payment creates an accumulated payment value that exceeds the payment cap.

2. The computer-implemented method according to claim 1, wherein said step of determining whether the at least one ACH payment creates an accumulated payment value that exceeds the payment cap comprises the steps of:

adding a sum value of the at least one ACH payment to a value of prior payments processed for the ODFI during the specified time period to obtain the accumulated payment value; and comparing the accumulated payment value to the payment cap.

3. The computer-implemented method according to claim 1, wherein said step of determining whether to exceed the payment cap comprises the steps of:

receiving approval from the ODFI to exceed the payment cap; and processing the at least one ACH payment in response to receiving the approval.

4. The computer-implemented method according to claim 1, wherein said step of determining whether to exceed the payment cap comprises the steps of:

receiving a denial of approval from the ODFI to exceed the payment cap; and rejecting the at least one ACH payment in response to receiving the denial of approval.

5. The computer-implemented method according to claim 1, wherein said step of determining whether to exceed the payment cap comprises the step of following default instructions from the ODFI regarding approval to exceed the payment cap.

6. The computer-implemented method according to claim 1, further comprising the steps of:

determining whether the ODFI desires value tracking of the at least one ACH payment; and performing said method in response to a determination that the ODFI desires value tracking of the at least one ACH payment.

7. The computer-implemented method according to claim 6, wherein said step of determining whether the ODFI desires value tracking comprises identifying a data string associated with the ACH file which indicates that the ODFI desires value tracking.

8. The computer-implemented method according to claim 7, wherein the data string identifies at least one of the ODFI and the remote sending point.

9. The computer-implemented method according to claim 7, wherein the data string identifies an originator of the ODFI.

10. The computer-implemented method according to claim 6, wherein said step of determining whether the ODFI desires value tracking comprises identifying the ODFI based on a dedicated node via which the ACH operator received the ACH file from the remote sending point.

11. The computer-implemented method according to claim 1, further comprising the step of pending the ACH file prior to performing said step of determining whether the at least one ACH payment creates an accumulated payment value that exceeds the payment cap.

12. The computer-implemented method according to claim 1, wherein the ACH file comprises a plurality of ACH payments, wherein said method further comprises the step of processing a portion of the ACH payments in response to a determination that the at least one ACH payment creates an accumulated payment value that exceeds the payment cap, wherein the portion of the ACH payments does not create an accumulated payment value that exceeds the payment cap.

13. The computer-implemented method according to claim 1, wherein the ACH file comprises an ACH batch that comprises the at least one ACH payment.

14. The computer-implemented method according to claim 1, wherein the at least one ACH payment comprises at least one ACH credit payment and the payment cap comprises a credit payment cap.

15. The computer-implemented method according to claim 1, wherein the at least one ACH payment comprises at least one ACH debit payment and the payment cap comprises a debit payment cap.

16. The computer-implemented method according to claim 1, wherein the specified time period comprises one of a settlement date on which the ACH operator will settle the at least one ACH payment, a process date on which the ACH operator will process the at least one ACH payment, and an exposure period based on processed but unsettled payments.

17. The computer-implemented method according to claim 1, wherein the remote sending point comprises one of a third party direct depositor and a remote originator.

18. The computer-implemented method according to claim 1, wherein the ODFI comprises an originating depository financial institution.

19. A computer-implemented method for value tracking of automated clearing house ("ACH") payments processed by an ACH operator, comprising the steps of:

receiving via a computer an ACH file at the ACH operator for ACH processing by the ACH operator, the ACH file comprising an ACH batch that comprises at least one ACH payment originated by a remote sending point on behalf of an originating depository financial institution ("ODFI") and forwarded to the ACH operator by the remote sending point;

adding via the computer a sum value of the at least one ACH payment in the ACH batch to a value of payments previously processed for the ODFI to obtain an accumulated payment value;

comparing via the computer the accumulated payment value to a pre-established payment cap to determine whether the accumulated payment value exceeds the payment cap;

processing the at least one ACH payment in response to a determination that the accumulated payment value does not exceed the payment cap; and determining whether to override the payment cap and to process the at least one ACH payment in response to a determination that the accumulated payment value exceeds the payment cap.

20. The computer-implemented method according to claim 19, wherein the ACH file comprises a plurality of ACH batches that each comprise at least one ACH payment, and wherein the method further comprises the step of parsing the ACH file to identify one of the ACH batches that comprises the at least one ACH payment originated by the remote sending point on behalf of the ODFI.

21. The computer-implemented method according to claim 19, wherein said step of determining whether to override the payment cap comprises the steps of:
receiving approval from the ODFI to exceed the payment cap; and
processing the at least one ACH payment in response to receiving the approval.

22. The computer-implemented method according to claim 19, wherein said step of determining whether to override the payment cap comprises the steps of:
receiving a denial of approval to exceed the payment cap from the ODFI; and
rejecting the ACH batch in response to receiving the denial of approval.

23. The computer-implemented method according to claim 19, wherein the ACH batch comprises a plurality of ACH payments, and
wherein said step of determining whether to override the payment cap comprises the steps of:
receiving a denial of approval to exceed the payment cap from the ODFI; and
rejecting a portion of the ACH payments in response to receiving the denial of approval.

24. The computer-implemented method according to claim 19, wherein said step of determining whether to override the payment cap comprises the step of following default instructions from the ODFI regarding approval to exceed the payment cap.

25. The computer-implemented method according to claim 19, further comprising the steps of:
determining whether the ODFI desires value tracking of the at least one ACH payment; and
performing said method in response to a determination that the ODFI desires value tracking of the at least one ACH payment.

26. The computer-implemented method according to claim 25, wherein said step of determining whether the ODFI desires value tracking comprises identifying a data string associated with the ACH batch which indicates that the ODFI desires value tracking.

27. The computer-implemented method according to claim 26, wherein the data string identifies at least one of the ODFI and the remote sending point.

28. The computer-implemented method according to claim 26, wherein the data string identifies an originator of the ODFI.

29. The computer-implemented method according to claim 25, wherein said step of determining whether the ODFI desires value tracking comprises identifying the ODFI based on a dedicated node via which the ACH operator received the ACH file from the remote sending point.

30. The computer-implemented method according to claim 19, further comprising the step of pending the ACH batch prior to performing said comparing step.

31. The computer-implemented method according to claim 19, wherein the ACH batch comprises a plurality of ACH payments,
wherein said method further comprises the step of processing a portion of the ACH payments in response to a determination that the accumulated payment value exceeds the payment cap, and
wherein a sum value of the portion of the ACH payments added to the value of payments previously processed for the ODFI results in an accumulated payment value that does not exceed the payment cap.

32. The computer-implemented method according to claim 19, wherein the at least one ACH payment comprises at least one ACH credit payment and the payment cap comprises a credit payment cap.

33. The computer-implemented method according to claim 19, wherein the at least one ACH payment comprises at least one ACH debit payment and the payment cap comprises a debit payment cap.

34. The computer-implemented method according to claim 19, wherein the value of prior payments previously processed for the ODFI is based on prior payments processed during a specified time period.

35. The computer-implemented method according to claim 34, wherein the specified time period comprises one of a settlement date on which the ACH operator will settle the at least one ACH payment, a process date on which the ACH operator will process the at least one ACH payment, and an exposure period based on processed but unsettled payments.

36. The computer-implemented method according to claim 19, wherein the remote sending point comprises one of a third party direct depositor and a remote originator.

37. The computer-implemented method according to claim 19, wherein the ODFI comprises an originating depository financial institution.

38. A computer-implemented method for value tracking of automated clearing house ("ACH") payments processed by an ACH operator, comprising the steps of:
receiving via a computer at the ACH operator an ACH file for ACH processing by the ACH operator, the ACH file comprising at least one ACH debit payment originated by a remote sending point on behalf of an originating depository financial institution ("ODFI") and forwarded to the ACH operator by the remote sending point;
adding via the computer a sum value of the at least one ACH debit payment to a value of prior debit payments previously processed for the ODFI during a specified time period to obtain an accumulated payment value;
determining via the computer whether the accumulated payment value exceeds a pre-established debit payment cap; and
rejecting the at least one ACH debit payment in response to a determination that the accumulated payment value exceeds the payment cap.

39. The computer-implemented method according to claim 38, wherein said rejecting step comprises the steps of:
determining whether to override the payment cap and to process the at least one ACH debit payment in response to a determination that the accumulated payment value exceeds the payment cap; and
rejecting the at least one ACH debit payment in response to a determination not to override the payment cap and to process the at least one ACH debit payment.

40. The computer-implemented method according to claim 38, further comprising the step of processing the at least one ACH debit payment in response to a determination that the accumulated payment value does not exceed the payment cap.

41. The computer-implemented method according to claim 39, wherein said step of determining whether to override the payment cap comprises the steps of:
receiving a denial of approval from the ODFI to exceed the payment cap; and
rejecting the at least one ACH debit payment in response to receiving the denial of approval.

42. The computer-implemented method according to claim 39, wherein the ACH file comprises an ACH batch that comprises the at least one ACH debit payment.

43. The computer-implemented method according to claim 42, wherein said step of determining whether to override the payment cap comprises the steps of:
  receiving a denial of approval from the ODFI to exceed the payment cap; and
  rejecting the ACH batch in response to receiving the denial of approval.

44. The computer-implemented method according to claim 42, wherein the ACH batch comprises a plurality of ACH debit payments, and
  wherein said step of determining whether to override the payment cap comprises the steps of:
  receiving a denial of approval from the ODFI to exceed the payment cap; and
  rejecting a portion of the ACH batch in response to receiving the denial of approval, the portion comprising ACH debit payments that cause the accumulated value to exceed the debit payment cap when added to the value of prior debit payments.

45. The computer-implemented method according to claim 39, wherein said step of determining whether to override the payment cap comprises the steps of:
  receiving approval from the ODFI to exceed the payment cap; and
  processing the at least one ACH debit payment in response to receiving the approval.

46. The computer-implemented method according to claim 39, wherein said step of determining whether to override the payment cap comprises the step of following default instructions from the ODFI regarding approval to exceed the payment cap.

47. The computer-implemented method according to claim 38, wherein the ACH file comprises a plurality of ACH batches that each comprise at least one ACH debit payment, and
  wherein the method further comprises the step of parsing the ACH file to identify one of the ACH batches that comprises the at least one ACH debit payment originated by a remote sending point on behalf of the ODFI.

48. The computer-implemented method according to claim 38, further comprising the steps of:
  determining whether the ODFI desires value tracking of the at least one ACH debit payment; and
  performing said method in response to a determination that the ODFI desires value tracking of the at least one ACH debit payment.

49. The computer-implemented method according to claim 48, wherein said step of determining whether the ODFI desires value tracking comprises identifying a data string associated with the ACH file which indicates that the ODFI desires value tracking.

50. The computer-implemented method according to claim 49, wherein the data string identifies at least one of the ODFI and the remote sending point.

51. The computer-implemented method according to claim 49, wherein the data string identifies an originator of the ODFI.

52. The computer-implemented method according to claim 48, wherein said step of determining whether the ODFI desires value tracking comprises identifying the ODFI based on a dedicated node via which the ACH operator received the ACH file from the remote sending point.

53. The computer-implemented method according to claim 38, further comprising the step of pending the ACH file prior to performing said step of determining whether the accumulated payment value exceeds the debit payment cap.

54. The computer-implemented method according to claim 38, wherein the specified time period comprises one of a settlement date on which the ACH operator will settle the at least one ACH debit payment, a process date on which the ACH operator will process the at least one ACH debit payment, and an exposure period based on processed but unsettled payments.

55. The computer-implemented method according to claim 38, wherein the remote sending point comprises one of a third party direct depositor and a remote originator.

56. The computer-implemented method according to claim 38, wherein the ODFI comprises an originating depository financial institution.

\* \* \* \* \*